United States Patent [19]
Lupo et al.

[11] Patent Number: 4,953,881
[45] Date of Patent: Sep. 4, 1990

[54] MECHANICAL STEERING DEVICE FOR THE REAR WHEELS OF MOTOR CARS WITH FOUR-WHEEL STEERING

[75] Inventors: Giorgio Lupo, Rivalta; Pier Carlo Capra, Turin, both of Italy

[73] Assignee: Fiat Auto S.p.A., Turin, Italy

[21] Appl. No.: 334,506

[22] Filed: Apr. 7, 1989

[30] Foreign Application Priority Data

Apr. 11, 1988 [IT] Italy .................. 67323 A/88

[51] Int. Cl.⁵ .................................. B62D 3/02
[52] U.S. Cl. .......................... 280/91; 74/497; 74/469
[58] Field of Search ............. 280/91; 74/497, 469, 74/107

[56] References Cited

U.S. PATENT DOCUMENTS

| | | | |
|---|---|---|---|
| 4,522,417 | 6/1985 | Sano et al. | 280/91 |
| 4,557,493 | 12/1985 | Sano et al. | 280/91 |
| 4,621,702 | 11/1986 | Kanazawa et al. | 280/91 |

FOREIGN PATENT DOCUMENTS

| | | | |
|---|---|---|---|
| 3344446 | 6/1984 | Fed. Rep. of Germany | 280/91 |
| 199573 | 9/1987 | Japan | 280/91 |
| 134376 | 6/1988 | Japan | 280/91 |
| 301181 | 12/1988 | Japan | 280/91 |

*Primary Examiner*—Charles A. Marmor
*Assistant Examiner*—Tamara L. Finlay
*Attorney, Agent, or Firm*—Sughrue, Mion, Zinn, Macpeak & Seas

[57] ABSTRACT

A mechanical steering device for the rear wheels of motor cars with four-wheel steering, including a front steering unit (4) and a rear steering unit (5) coupled for rotation with each other by a longitudinal transmission shaft (6), in which the rear steering unit (5) includes a transverse bar (11) connected to the rear wheels (2) by respective steering joints and tie rods (9, 10). The rotation of the longitudinal shaft (6) is transformed into translation of the transverse bar (11) by a positive cam (12).

5 Claims, 3 Drawing Sheets

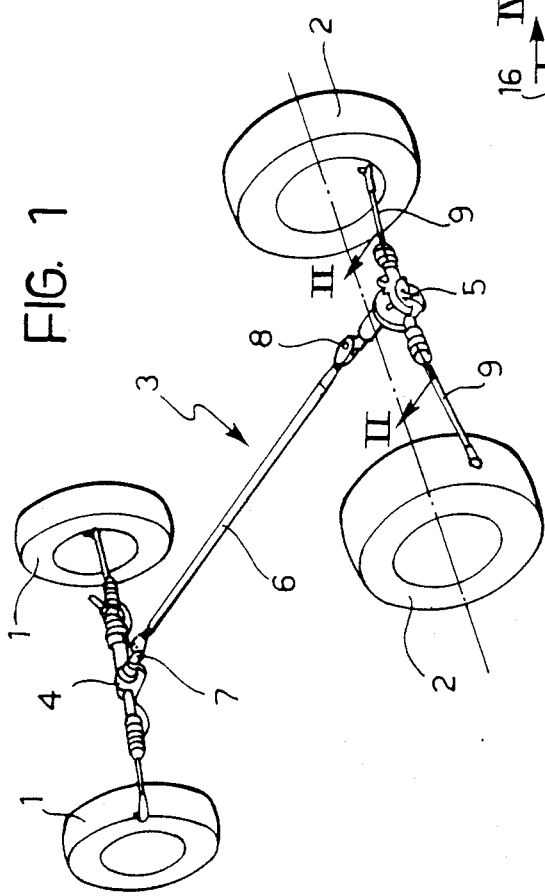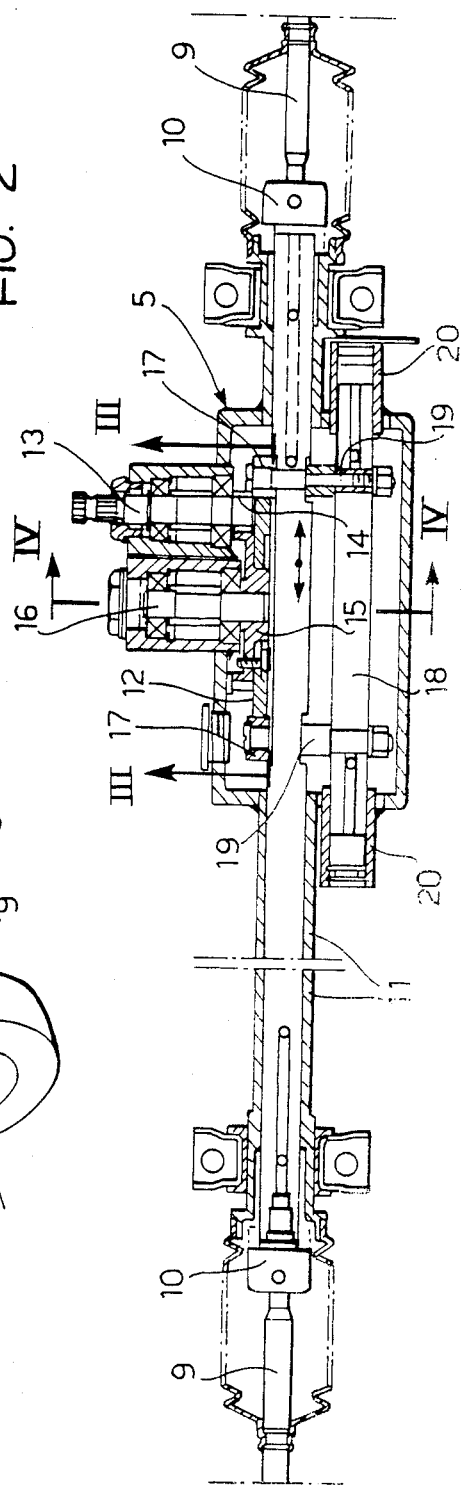

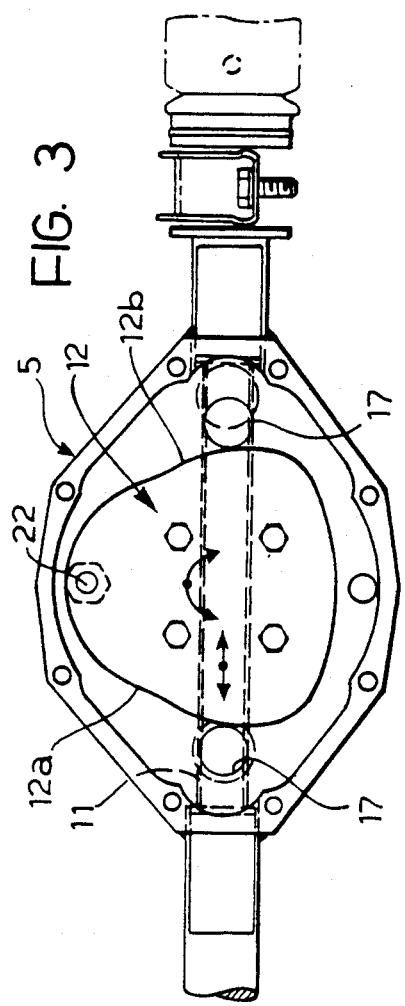
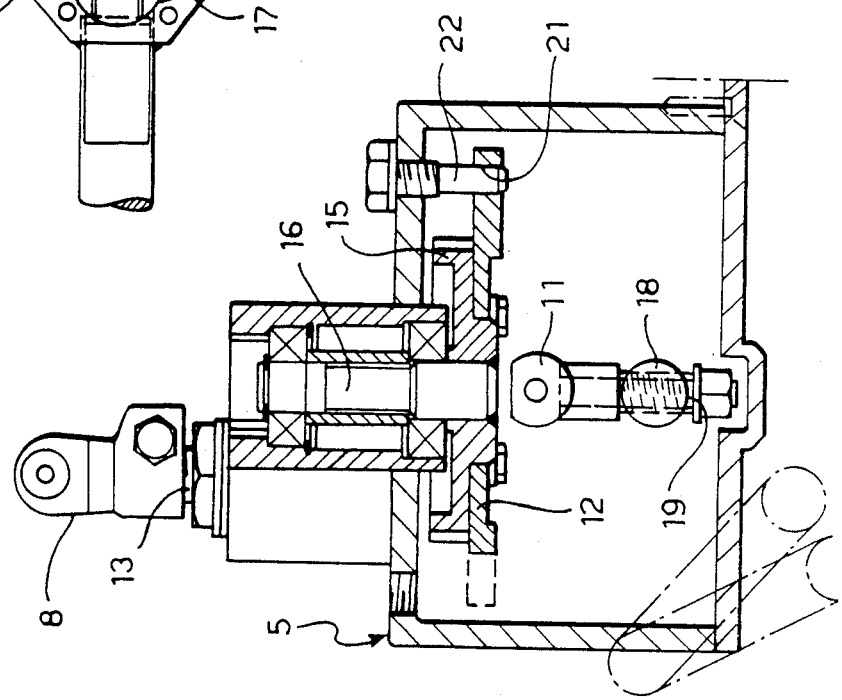

MECHANICAL STEERING DEVICE FOR THE REAR WHEELS OF MOTOR CARS WITH FOUR-WHEEL STEERING

BACKGROUND OF THE INVENTION

The present invention relates in general to motor cars with four-wheel steering.

More particularly, the invention concerns a mechanical steering device for the rear wheels of cars with four-wheel steering, including a front steering unit and a rear steering unit coupled for rotation with each other by means of a longitudinal transmission shaft, and in which the rear steering unit comprises a transverse bar connected to the rear wheels by means of respective steering joints and tie rods, and transmission means for transforming the rotation of the longitudinal shaft into translation of the transverse bar.

Mechanical steering devices of this type are known, for example, from U.S.-A- U.S. Pat. No. 4,557,493 and U.S.-A- U.S. Pat. No. 4,522,417. In these known devices, the transmission between the longitudinal shaft and the transverse bar includes a cascade connection of eccentric shafts using a movable crown wheel in contact with a fixed ring gear. This type of transmission enables reversal of the orientation of the rear wheels which are steered in phase with the front wheels for limited angles of rotation of the steering wheel and in counterphase with front wheels at large angles of rotation of the steering wheel. The disadvantage of these known devices lies on the one hand in a considerable structural complexity, and on the other hand in the practical impossibility of achieving steering laws other than pseudosinusoidal laws.

SUMMARY OF THE INVENTION

The object of the present invention is to avoid the above problem and to produce a mechanical steering device of the type defined at the beginning, which is simple and cheap to produce and can easily by adapted to different types of steering laws, in dependence on the requirements of use.

According to the invention, this object is achieved by virtue of the fact that the transmission means for transforming the rotation of the longitudinal shaft into translation of the transverse bar are constituted by a positive cam. The term "positive cam" is intended to designate, in the following description and claims, a double-effect cam, i.e. a cam which is operative on both opposite sides.

By virtue of this concept, the steering device can be produced more simply and cheaply than known solutions and also enables different predetermined steering laws to be achieved easily, by the simple replacement of the positive cam with cams of different shapes.

The positive cam may conveniently be constituted by a plate which is rotatable about an axis perpendicular to the transverse bar and is provided with convexo-concave lateral active profiles against which two roller-followers carried by the transverse bar react from opposite sides.

By virtue of this arrangement, when the steering wheel of the vehicle is rotated in use, a rotation of the cam is produced which, since the cam is in direct contact with the roller-followers, causes a positive actuation of the movement of the transverse bar connected to the rear wheels. This transverse bar can thus be translated in one direction or in the opposite direction with the maximum precision when the sense of movement is reversed, by virtue of the positive type of actuation. It is clear that the displacement of the bar is determined by the height of the cam profile and is proportional to the angle of rotation of the steering wheel.

The rear steering unit may conveniently include an input shaft coupled for rotation with the longitudinal shaft, an idle shaft parallel to the input shaft and to which the positive cam is fixed for rotation, and a geared reduction unit which couples the input shaft and the idle shaft for rotation.

In this way, the torque transmitted to the longitudinal transmission shaft is reduced, with smaller torsion angles and less stressing of the respective joints for connection to the front and rear steering units.

In order to prevent the action of the forces applied by the positive cam to the roller-followers from causing the rotation of the transverse bar about its own axis, the rear steering unit also conveniently includes a guide bar which is slidable parallel to the transverse bar and is connected thereto by means of a pair of pins carrying the roller-followers.

According to a further characteristic of the invention, the device also comprises means for adjustment of the rear steering linkage, including a screw push rod which can be inserted through a hole in the cam temporarily to lock it against rotation in the central position.

BRIEF DESCRIPTION OF THE DRAWINGS

Further characteristics and advantages of the invention will become clear from the detailed description which follows with reference to the appended drawings, provided by way of non-limiting example, in which:

FIG. 1 is a schematic perspective view of a four-wheel steering system for motor cars provided with a device for steering the rear wheels, according to the invention, FIG. 2 is a cross-section taken on the line II—II of FIG. 1, on an enlarged scale, FIG. 3 is a section taken on the line III—III of FIG. 2, FIG. 4 is a section taken on the line IV—IV of FIG. 2.

DETAILED DESCRIPTION OF THE INVENTION

Figure 5:
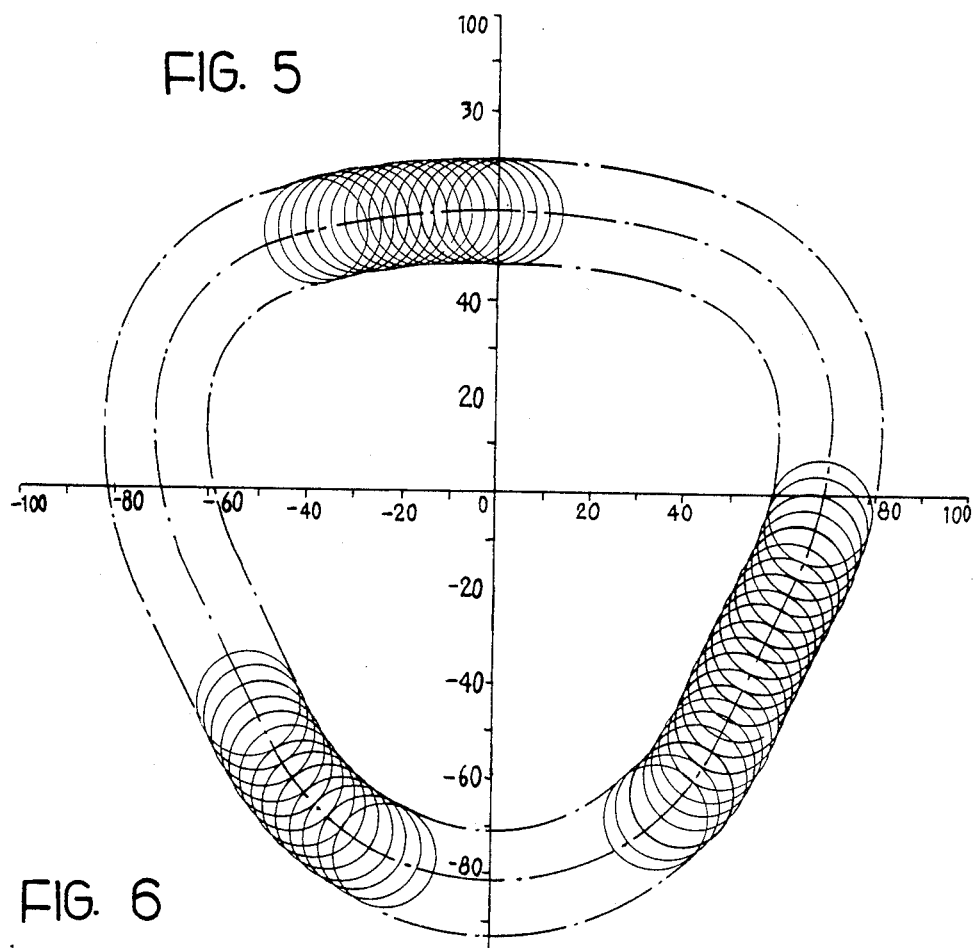
FIG. 5 is a graph which shows possible theoretical and working profiles of the positive cam of the device.

With reference initially to FIG. 1, the front wheels and the rear wheels of a motor car provided with a four-wheel steering system, generally indicated 3, are indicated 1 and 2. This system comprises essentially a front steering box 4, of generally conventional type provided with a drive output to the rear axle, and a rear steering box 5 which are directly interconnected mechanically by means of a longitudinal transmission shaft 6 and respective universal joints 7 and 8.

The rear steering box 5, which will be described in detail below, steers the rear wheels 2 through respective steering tie rods 9 and joints 10.

Now, with reference in greater detail to FIGS. 2 to 4, a transverse bar 11 is slidable in the rear steering box 5 in a direction perpendicular to the longitudinal shaft 6 and its displacement in one direction or in the opposite direction is caused, according to the invention, by means of an actuating cam 12 of the positive type. The cam 12 is constituted by a plate which is rotatable about an axis perpendicular to the transverse bar 11 and hence essentially parallel to the longitudinal shaft 6, and is rotated by means of an input shaft 13 whose end outside the rear steering box 5 is coupled for rotation with the longitudinal shaft 6. The inner end of the input shaft 13 carries a driving sprocket 14 meshed with a driven gear 15 which is in turn keyed to an idle shaft 16 alongside and parallel to the input shaft 13. The cam 12 is coupled for rotation with the gear 15 and is therefore rotated by the longitudinal shaft 6 at a reduction ratio which corresponds to that of the pair of gears 14 and 15.

As can better be seen in FIG. 3, in the embodiment illustrated, the cam 12 is generally pear-shaped with convexo-concave lateral active profiles 12a, 12b against which two roller-followers 17 carried by the transverse bar 11 bear in rolling contact, on opposite sides of the cam 12. The theoretical and working profiles of the cam 12 of FIGS. 2 to 4 are shown in FIG. 5. In particular, the working profile obtained is the envelope of the circumferences whose centres lie on the theoretical profile and whose radii are equal to those of the roller-followers 17 which enable the positive drive to be achieved. The theoretical profile shown in FIG. 5 enables the steering curve of the rear wheels 2 shown in FIG. 6 to be obtained as a function of the angle of rotation of the steering wheel of the vehicle. This steering curve may be varied according to a plurality of different predetermined steering laws, simply by the replacement of the cam 12 with cams of different shapes.

In order to prevent the action of the forces applied by the cam 12 to the followers 17 from causing rotation of the transverse bar 11 about its own axis, a guide bar 18 is associated with the latter and is slidably supported at its ends within guides 20 of the box 5 and connected to the transverse bar 11 by means of two pins 19 which support the roller-followers 17 for rotation.

According to another characteristic of the invention, the cam 12 is provided, in correspondence with its median axis of symmetry, with a hole 21 adapted to be engaged by a screw push rod 22 which can be screwed into the steering box 5 from the outside temporarily to lock the cam 12 and hence the transverse bar 11 in the central position corresponding to the condition of alignment of the rear wheels 2. This provides for the adjustment of the rear steering linkage when the car is assembled: once the adjustment operation is complete, the screw push rod 22 is disengaged from the cam 12 and removed.

In use, the turning of the steering wheel of the vehicle causes a rotation of the cam 12 (in dependence on the transmission and reduction ratios of the rear steering box 5 relative to the front steering box) which, by means of the roller-followers 17, causes a positive actuation of the movement of the transverse bar 11. The latter can thus move to the right or to the left with maximum precision (minimum play) when the movement is reversed. The provision of a series of rollers 17 having slightly different external diameters enables any play between the cam 12 and the rollers 17 to be recovered to minimum values suitable for the best operation, during assembly of the rear steering box 5.

Figure 6:
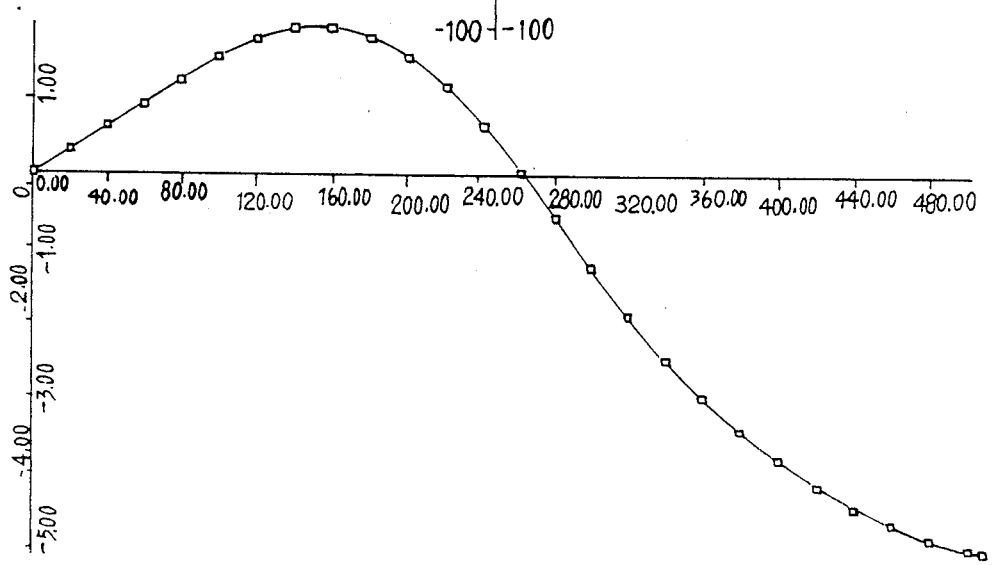
FIG. 6 is a graph which shows the steering curve of the rear wheels as a function of the angle of rotation of the steering wheel, obtainable by means of the theoretical profile of the positive cam shown in FIG. 5.

It is clear that the displacement of the transverse bar 11 is determined by the height of the profile of the cam 12 and is proportional to the angle of rotation of the steering wheel, as shown by way of example in FIG. 6.

The presence of the reduction unit constituted by the gears 14 and 15 enables a reduction of the torques transmitted to the longitudinal shaft 6 to be achieved, with reduced angles of torsion thereof and consequently less stressing of the universal joints 7 and 8 so that their angular play has less effect.

The main advantages of the device according to the invention may be summarised as follows:

the possibility of the simple and cheap achievement of a plurality of different steering laws calculated in order to optimise the handling of the vehicle, by the replacement of the positive cam 12 with similar cams having different profiles;

the irreversibility of the rear steering system, whereby the re-alignment of the rear wheels 2 is effected by the (suitably increased) re-aligning torque of the front steering system;

the possibility of adjustment of the rear steering linkage with the rear wheels 2 in position, by means of the pin 22 (which is removed upon completion of the adjustment);

the structural simplicity of the device, by virtue of the use of the positive cam 12 which can easily be made by blanking and trimming with tools (millers or grinders) having the same diameter as the roller-followers 17, by production techniques using machine tools, the ease of adjustment and take-up of any play due to wear by the replacement of rollers 17 with rollers of greater diameter.

Naturally, the forms of embodiment and details of construction of the device may be varied widely with respect to those described and illustrated, without thereby departing from the scope of the present invention.

Thus, for example, the idle shaft 16 carrying the positive cam 12 could be connected directly to the longitudinal transmission shaft 6, further simplifying the production of the device.

We claim:

1. A mechanical steering device for the rear wheels of motor cars with four-wheel steering, including a front steering unit, a rear steering unit and a longitudinal transmission shaft coupling for rotation said front and rear steering units, and for rotation said front and rear steering units, and in which the rear steering unit comprises a transverse bar and respective steering joints and tie rods connecting said transverse bar to the rear wheels, and transmission means for transforming the rotation of the longitudinal shaft into translation of the transverse bar, wherein the transmission means are constituted by a positive cam (12), said cam (12) being constituted by a plate which is rotatable about an axis perpendicular to the transverse bar (11) and which is provided with convexo-concave lateral active profiles (12a, 12b) against which two roller-followers (17) carried by the transverse bar (11) react from opposite sides.

2. A device according to claim 1, wherein the rear steering unit (5) comprises an input shaft (13) coupled for rotation with the longitudinal shaft (6), an idle shaft (16) parallel to the input shaft (13) and to which the positive cam (12) is fixed for rotation, and a geared reduction unit (14, 15) which couples the input shaft (13) and the idle shaft (16) for rotation.

3. A device according to claim 2, wherein the rear steering unit (5) also includes a guide bar (18) which is slidable parallel to the transverse bar (11) and is coupled thereto by means of a pair of pins (19) carrying the roller-followers (17).

4. A device according to claim 1 also including means for adjusting the rear steering linkage (9, 10), comprising a screw push rod (22) which can be inserted through a hole (21) in the positive cam (12) temporarily to lock it against rotation in the central position.

5. A device according to claim 1, characterised in that roller-followers (17) of different diameters are provided which can be used for adjusting the clearances during assembly.

* * * * *